(12) United States Patent
Ivanov et al.

(10) Patent No.: US 7,444,116 B2
(45) Date of Patent: Oct. 28, 2008

(54) METHOD OF TRANSMITTING A MESSAGE IN A MOBILE COMMUNICATIONS SYSTEM USING A MOBILE REPEATER

(75) Inventors: Valery Filippovich Ivanov, Moscow (RU); Karen Jurievich Djermakyan, Moscow (RU); Jury Borisovich Zubarev, Moscow (RU); Fedor Konstantinovich Panferov, Moscow (RU); Viliam Karpovich Sarian, Moscow (RU)

(73) Assignee: Obschestvo S Ogranichennoi Otvetstvennostju "Sivera" (Sivera Limited), Moscow (RU)

( * ) Notice: Subject to any disclaimer, the term of this patent is extended or adjusted under 35 U.S.C. 154(b) by 887 days.

(21) Appl. No.: 10/489,375

(22) PCT Filed: Sep. 12, 2002

(86) PCT No.: PCT/RU02/00424

§ 371 (c)(1),
(2), (4) Date: Aug. 19, 2004

(87) PCT Pub. No.: WO03/024124

PCT Pub. Date: Mar. 20, 2003

(65) Prior Publication Data

US 2004/0266340 A1    Dec. 30, 2004

(30) Foreign Application Priority Data

Sep. 12, 2001  (RU) ............................... 2001124924

(51) Int. Cl.
*H04B 7/14* (2006.01)

(52) U.S. Cl. .......................................... 455/11.1; 455/9
(58) Field of Classification Search ................ 455/11.1, 455/7, 9
See application file for complete search history.

(56) References Cited

U.S. PATENT DOCUMENTS

| 4,539,706 | A | | 9/1985 | Mears et al. |
| 5,020,091 | A | | 5/1991 | Kolopp et al. |
| 5,090,051 | A | | 2/1992 | Muppidi et al. |
| 5,365,573 | A | | 11/1994 | Sakamoto et al. |
| 5,371,781 | A | | 12/1994 | Ardon |
| 5,530,736 | A | | 6/1996 | Comer et al. |
| 5,850,593 | A | * | 12/1998 | Uratani ................ 455/11.1 |
| 6,272,359 | B1 | * | 8/2001 | Kivela et al. ........... 455/567 |
| 6,285,857 | B1 | * | 9/2001 | Javitt ................. 455/11.1 X |
| 2001/0002365 | A1 | * | 5/2001 | Minakuchi et al. ..... 455/11.1 X |

FOREIGN PATENT DOCUMENTS

| EP | 1143641 A1 | 10/2001 |
| WO | WO 00/18040 | 3/2000 |

* cited by examiner

*Primary Examiner*—Philip J Sobutka
(74) *Attorney, Agent, or Firm*—Christopher L. Parmelee; Walker & Jocke LPA

(57) ABSTRACT

The invention relates to personal radio communications and can be used in a mobile telephone communications system. The mobile communications system includes a mobile communication means 1 for transmitting messages either directly by generating an electromagnetic radiation, or through a mobile repeater 3 by generating an auxiliary flux. The mobile communication means 1 receives data either directly from a base transceiving station 9, or from the repeater 3 using an additional auxiliary radiation generated by the mobile repeater.

11 Claims, 4 Drawing Sheets

METHOD OF TRANSMITTING A MESSAGE IN A MOBILE COMMUNICATIONS SYSTEM USING A MOBILE REPEATER

FIELD OF THE INVENTION

The invention relates to wireless communications in general and particularly to personal radio communications, and is applicable in a mobile telephone communications system.

BACKGROUND OF THE INVENTION

Most of conventional apparatuses for transmitting a message in a mobile communications system comprise a transceiver coupled to a control unit and including an emitter, such as a transceiver antenna (U.S. Pat. No. 5,530,736 A, IPC H04Q Jul. 20, 1994). A disadvantage of the mentioned and similar radiotelephones is that the electromagnetic radiation affects the user's (subscriber) health, and in particular the radiation acts on his/her head causing, in particular, cancer diseases. The reason is that practically all mobile communications systems use a decimeter range frequency (900-1800 MHz), which frequency, at a radiation power of about one Watt and practically a zero distance between a mobile communication means, such as a radiotelephone, and the user's head, is capable of creating in the temporal bone area a power density 10-100 times exceeding the permitted values.

Another disadvantage of the known mobile communications systems operated on the basis of fixed base stations is inconsistency between radiation powers of a base station and, for example, a mobile telephone. Their receivers have practically equal sensitivity, and a lower, as compared with a base station, radiation power of a mobile telephone often becomes the cause of the unilateral communication, when only reception of a signal from a base station is possible. Among the main causes of this problem, a low radiation power of a cellular telephone (as compared to that of a base station) and its unamenable location, e.g. in closed premises, can be mentioned.

Most closely related to the present invention in respect of the set of essential features and lacking the aforementioned disadvantages is a method of transmitting a message in a mobile communications system, including: transmitting, by a mobile communication means, such as a radiotelephone having a first subscriber or identification number and an input device and a display, an electromagnetic radiation encoded by the message, e.g. by modulation, said electromagnetic radiation having predetermined values of electromagnetic radiation parameters, and receiving, by the mobile communication means from a base transceiving station coupled with a first subscriber or identification number logging means, an electromagnetic energy flux having predetermined parameters and modulated by transmitted data; generating, in the mobile communication means, a message-encoded auxiliary radiation, and using, for each mobile communication means, at least one mobile repeater having a memory; said repeater receiving and processing the auxiliary radiation for predetermined values of quality estimates of communication between the mobile communication means and the mobile repeater, or between the mobile repeater and the base transceiving station, and generating and transmitting said message-encoded electromagnetic radiation, and exchanging control and clock signals between the mobile communication means and the base transceiving station (PCT Application WO 00/18040, Mar. 30, 2000).

The method is implemented in an apparatus for transmitting a message in a mobile communications system, including one or more base transceiving stations and a mobile communication means. The mobile communication means includes, coupled to a central controller, a radiotelephone transceiver and an auxiliary radiation transceiver matched over auxiliary communication channels with a mobile repeater including a repeater controller coupled to an internal memory of the mobile repeater, the mobile repeater being a bilateral mobile repeater whose internal memory stores a subscriber number of the mobile repeater, the mobile repeater comprising, coupled to the repeater controller, at least one bilateral radiotelephone transceiver and one bilateral auxiliary radiation transceiver, each of them being matched by its parameters with the base transceiving station and the auxiliary radiation transceiver of the mobile communication means, respectively.

However, the use of the prior art method and apparatus in mobile communications systems where data is continuously exchanged between the mobile communication means and the base station involves difficulties. This is due to the fact that when a message is transmitted through a mobile repeater, the message is received from a base station directly by a mobile communication means, and this may cause faulty operation of the system due to appearance of additional delay of response signal (after the reception of the message) associated with its processing in the mobile repeater.

SUMMARY OF THE INVENTION

The object of the present invention is to eliminate impact of the additional delay on reliability of the system operation.

The object is attained in accordance with the invention by transmitting, by a mobile communication means, such as a radiotelephone having a first subscriber or identification number and an input device and a display, an electromagnetic radiation encoded by the message, e.g. by modulation, said electromagnetic radiation having predetermined values of electromagnetic radiation parameters; and receiving, by the mobile communication means from a base transceiving station coupled with a first-subscriber or identification number logging means, an electromagnetic energy flux having predetermined parameters and modulated by transmitted data; generating, in the mobile communication means, a message-encoded auxiliary radiation; and using for each mobile communication means at least one mobile repeater having a memory; said mobile repeater receiving and processing the auxiliary radiation for predetermined values of quality estimates of communication between the mobile communication means and the mobile repeater, or between the mobile repeater and the base transceiving station, and generating and transmitting said message-encoded electromagnetic radiation; exchanging control and clock signals between the mobile communication means and the base transceiving station; storing, in the mobile repeater memory, a second subscriber or identification number, and connecting the mobile repeater with the base transceiving station for the predetermined value of said communication quality estimate, and then receiving by the mobile repeater from the base transceiving station the electromagnetic energy flux having the predetermined parameters and modulated by the transmitted data; wherein the message being received by the mobile communication means by receiving from the mobile repeater an additional auxiliary radiation modulated by the transmitted data, and said exchanging of the control and clock signals being performed between the mobile repeater and the base transceiving station.

The method can be implemented in an apparatus having one or more base transceiving stations and comprising a mobile communication means including, coupled to a central controller, a radiotelephone transceiver and an auxiliary radiation transceiver matched, over auxiliary communication channels, with a mobile repeater including a repeater controller coupled to an internal memory of the mobile repeater, said mobile repeater being a bilateral mobile repeater whose internal memory stores a subscriber or identification number of the mobile repeater, the mobile repeater comprising, coupled to the repeater controller, at least one bilateral radiotelephone transceiver and one bilateral auxiliary radiation transceiver, each of them being matched by its parameters with the base transceiving station and the auxiliary radiation transceiver of the mobile communication means, respectively.

The method in accordance with the present invention, first, eliminates the impact exerted on individual's health by a mobile communication means operating jointly with base transceiving stations and, second, improves quality of communication. Other features and advantages of the invention will be obvious from the following detailed description and claims.

DETAILED DESCRIPTION OF THE PREFERRED EMBODIMENTS

Figure 1:
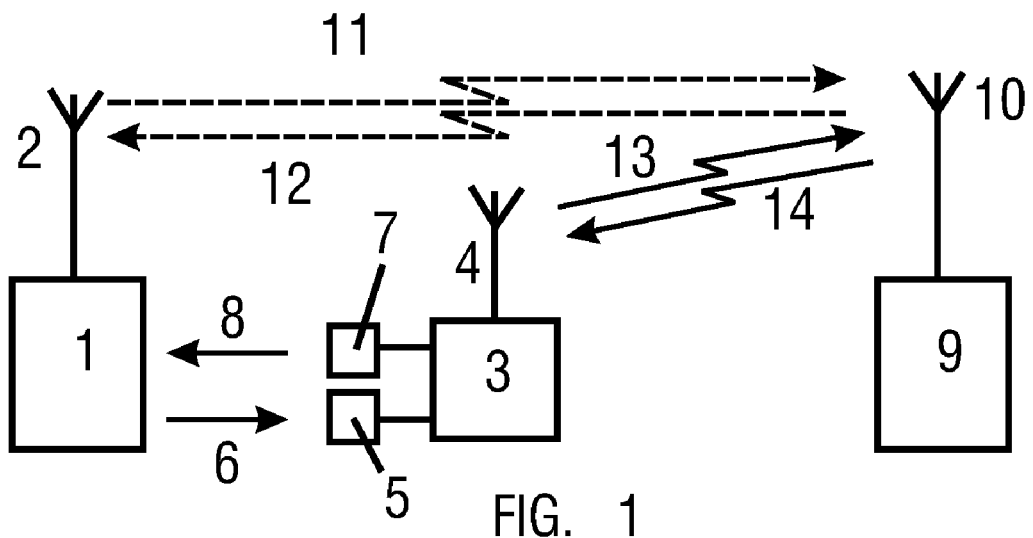
FIG. 1 is a structural black diagram of a first embodiment of a mobile communications system.

FIG. 1 represents a structural block diagram of a first embodiment of a mobile communications system wherein an apparatus for transmitting a message includes a mobile communication means 1, such as a mobile telephone having a transceiver antenna 2, and a bilateral mobile repeater 3 having a transceiver antenna 4, a receiver 5 for receiving an auxiliary radiation flux 6 emitted by the mobile communication means 1, and an emitter 7 of an additional auxiliary radiation flux 8. The additional auxiliary radiation can be generated by the bilateral mobile repeater 3 as a light, infrared or ultrasonic radiation modulated by the transmitted data. The system further includes one or more base transceiving stations (BTS) 9 having an antenna 10. The bilateral communication feature of the mobile repeater 3 provides the ability of retransmitting a message both from the mobile communication means 1 to the BTS 9, and from the BTS to the mobile communication means 1. The base transceiving station 9 is coupled with a first subscriber number logging means (not shown), such as any conventional means, e.g. Mobile Switching Center (MSC) comprising Home Location Registers (HLR) for GSM, and another devices. The bilateral mobile repeater 3 is implemented as a portable device located near a subscriber who has the mobile communication means 1, and intended to retransmit the auxiliary radiation flux 6, as well as the additional auxiliary radiation 8 from the bilateral mobile repeater. Process of transmission of a message-encoded, e.g. by modulation, electromagnetic radiation from the mobile communication means, where the electromagnetic radiation has predetermined values of electromagnetic radiation parameters, is shown by dashed broken arrow 11, while process of reception, by the mobile communication means from the BTS 9, of electromagnetic energy flux having predetermined parameters and modulated by transmitted data is shown by dashed broken arrow 12. Process of transmission by the bilateral mobile repeater 3 of a message-encoded, e.g. by modulation, electromagnetic radiation having predetermined values of its parameters, is shown by broken arrow 13, while the process of reception, by the bilateral mobile repeater 3 from the BTS 9, of electromagnetic energy flux with predetermined parameters and modulated by transmitted data is shown by broken arrow 14. For convenience, in the following description the reference number of appropriate broken line will also refer to a corresponding communication channel. By way of example, instead of the phrase "process of reception, by the mobile repeater 3 from the BTS 9, of electromagnetic energy flux having predetermined parameters and modulated by transmitted data is shown by broken arrow 14" the phrase "data is received from the BTS 9 on channel 14" will be used.

Figure 2:
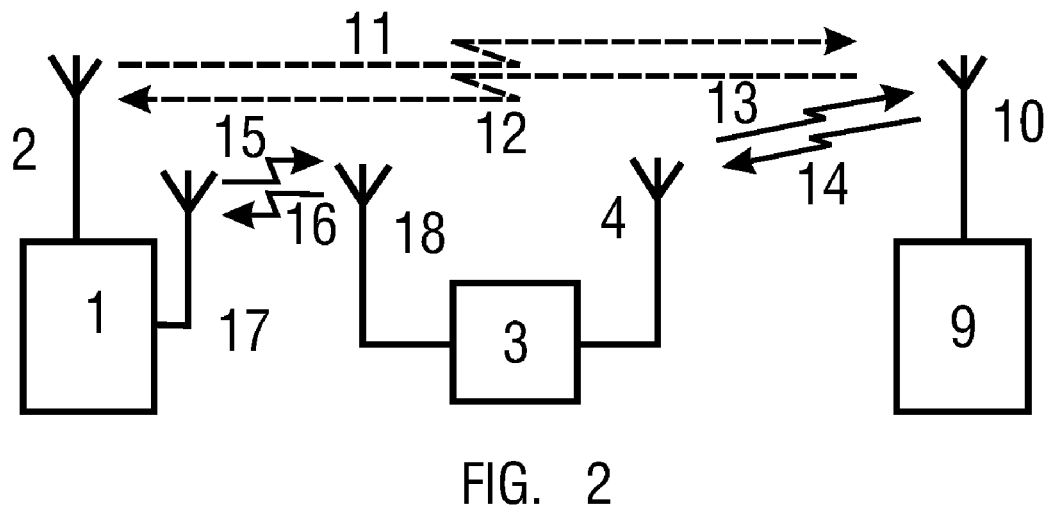
FIG. 2 is a structural block diagram of another embodiment of a mobile communications system.
Figure 3:
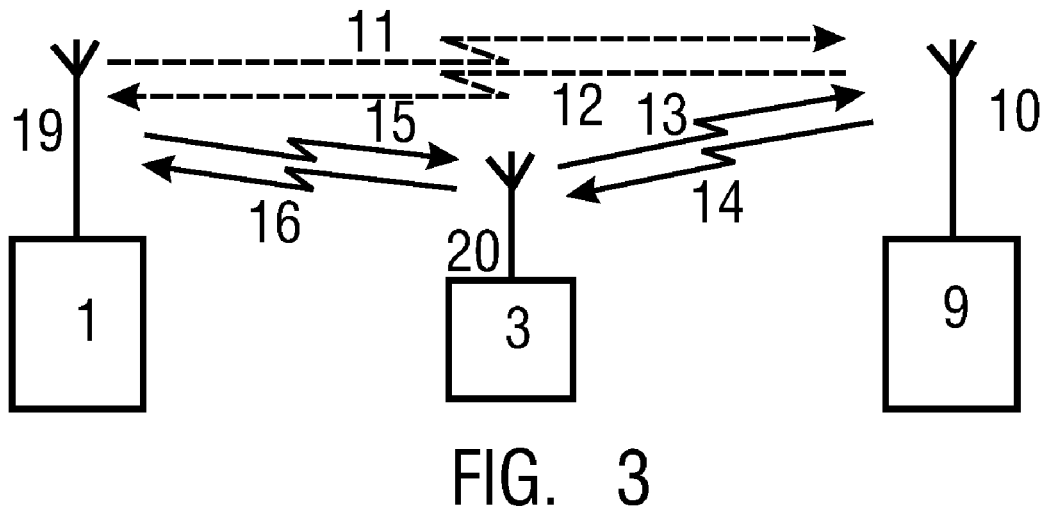
FIG. 3 is a structural block diagram of another embodiment of a mobile communications system.

FIG. 2 shows a structural block diagram of a mobile communications system wherein the auxiliary radiation is an electromagnetic radiation 15, and the additional auxiliary radiation is an electromagnetic radiation 16. To transmit and receive the auxiliary radiation 6, the mobile communication means 1 has an additional antenna 17, and the bilateral mobile repeater 3 has an additional antenna 18. It should be noted that a similar repeater design is described in U.S. Pat. No. 4,539,706, and the system can use several mobile repeaters 3, each having a subscriber number of its own. In operation of the bilateral mobile repeater 3 and the mobile communication means 1, two common transceiving antennas 19, 20 can be used (FIG. 3). In the latter case a duplex filter—a device for dividing a reception and transmission band—can be used. It should be noted that channels 11, 12, 13 and 14 are physical channels (representing e.g. a combination of time and frequency division channels and defined as a sequence of radio frequency channels with frequency hopping and time slots), and can also include logical control and clock channels (control signal transmission channels, common control channels, individual control channels, frequency control channel, multiple access channel, etc.) on which control and lock signals are exchanged between the BTS 9 and the mobile communication means 1 (channels 11, 12), or between the BTS 9 and the bilateral mobile repeater 3 (channels 13, 14) All of the signals are generated in a base station controller (BSC) coupled to the BTS 9.

Figure 4:
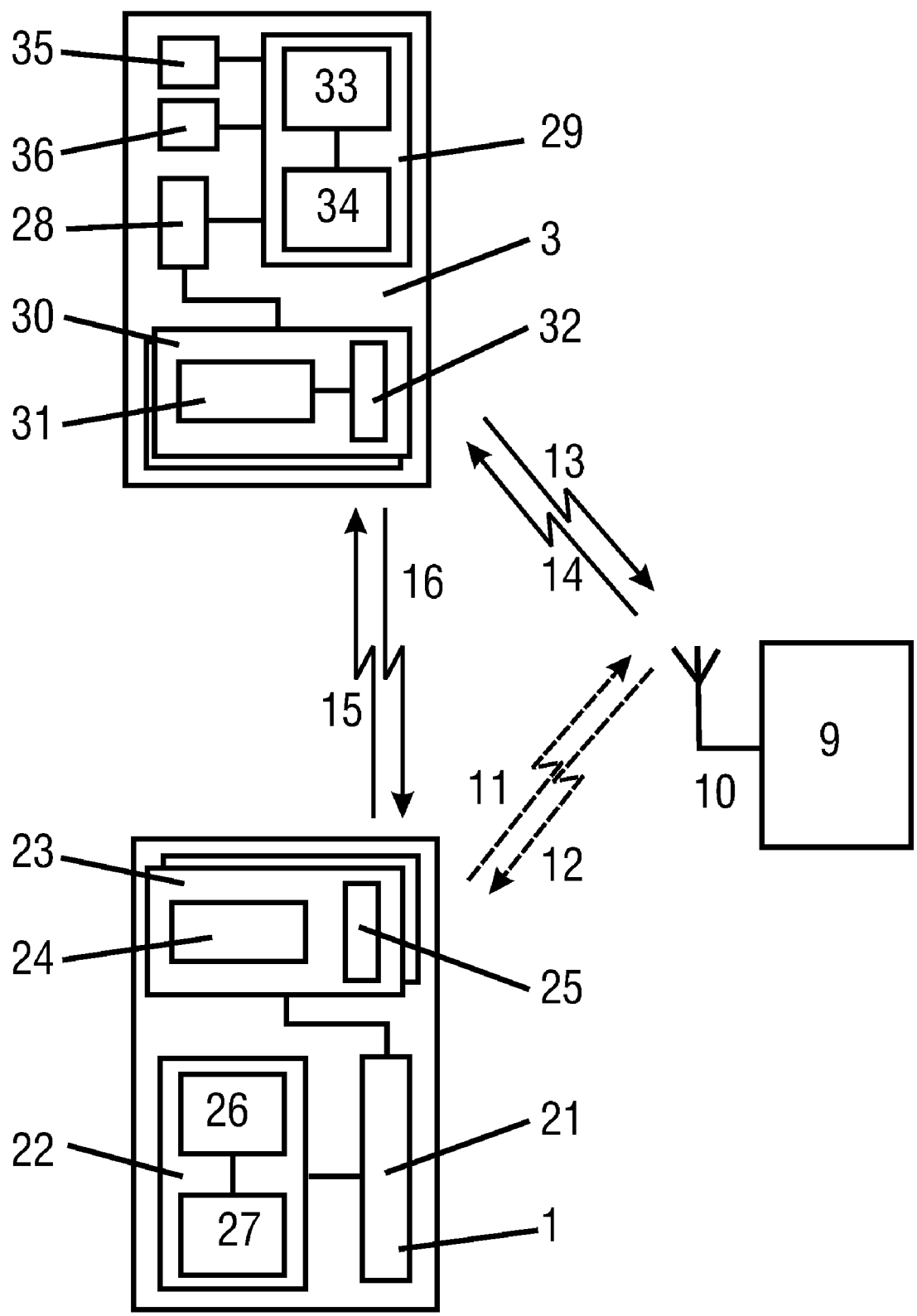
FIG. 4 is a functional block diagrams of a mobile communication means.

FIG. 4 shows functional block diagrams of a mobile communication means 1, such as a mobile radiotelephone, and a bilateral mobile repeater 3. The mobile radiotelephone comprises, connected via an interface 21 to a central controller 22, one or more transceivers 23, at least two of which are a radiotelephone transceiver and an auxiliary radiation transceiver. Each of the transceivers 23 includes at least an output unit (radio circuitry) 24 connected to an individual or common antenna 25. The central controller 22, in turn, comprises along with: an input device and a display unit (not shown) a central processor unit (CPU) 26 connected to a memory 27. The bilateral mobile repeater 3 comprises, connected via an interface 28 to a repeater controller 29, one or more transceivers 30, at least two of which are a bilateral radiotelephone transceiver and a bilateral auxiliary radiation transceiver, each of then being matched by its parameters with the base transceiving station 9 and a respective auxiliary radiation transceiver 23, respectively. The aforementioned bilateral communication ability of a respective transceiver provides the capability of data reception from and transmission to only one of said means 1, 9. Each radio transmitter 30 includes at least an output unit 31 (radio circuitry) coupled to an individual or common antenna 32. A repeater controller 29, in turn, comprises a central logic unit (CLU) 33 connected to an internal memory 24 of the bilateral mobile repeater. Some embodiments can comprise electronic identification card reading means 35 coupled to the repeater controller. A similar means for reading from an identification card comprising e.g. a first subscriber or identification number can be included in the mobile communication means 1. In addition, the bilateral mobile repeater can further comprise an additional identification card reading means 36 coupled to the repeater controller 29. In another embodiment of the mobile repeater, the identification card can be either a detachable or built-in unit. In another embodiments of the bilateral mobile repeater, a respective bilateral auxiliary radiation transceiver can be a bilateral transceiver of light, infrared or ultrasonic radiation, and furthermore, one bilateral mobile repeater 3 can operate with several mobile communication means 1; a respective auxiliary radiation transceiver 23 of each mobile communication means 1 should shall be matched with a respective bilateral auxiliary radiation transceiver 30. It should be noted that channels 15 and 16 could be provided by such wireless communication standards as DECT, NTT Digital Cordless, CT2, Bluetooth. In this case, however, to simplify the bilateral mobile repeater design it is expedient to use additional repeater controllers 29 suitable for the corresponding system, e.g. DECT system. An additional interface would be also needed to couple the DECT system to the standard used in the mobile repeater, e.g. GSM.

Figure 5:
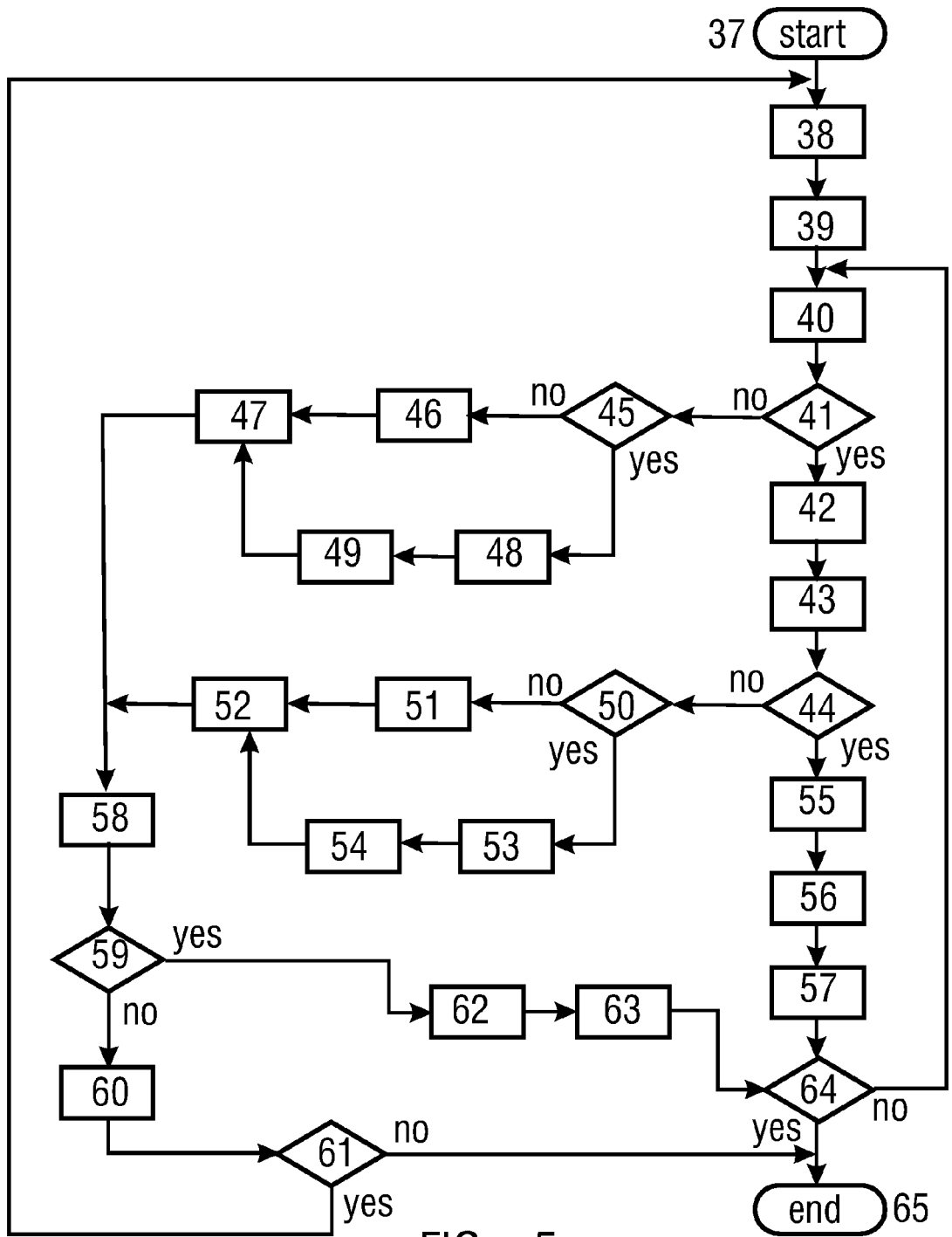
FIG. 5 is a flow chart illustrating how a radiotelephone in mobile communications system operates.

FIG. 5 is a flow chart illustrating how the apparatus functions. Reference numerals in blocks shown in the flow chart correspond to the following steps. 38 denotes the step "Generate and transmit enable signal"; 39 denotes the step "Establish connection"; 40 denotes the step "Estimate communication quality"; 41 denotes the decision step "Communication quality satisfies?"; 42 denotes the step "Indicate"; 43 denotes the step "Establish connection"; 44 denotes the decision step "Communication quality satisfies?"; 45 denotes the decision step "Repeater enabled?"; 46 denotes the step "Indicate"; 47 denotes the step "Generate instruction"; 48 denotes the step "Generate instruction", 49 denotes the step "Generate instruction"; 50 denotes the decision step "Repeater enabled"?; 51 denotes the step "Indicate"; 52 denotes the step "Generate instruction"; 53 denotes the step "Generate instruction"; 54 denotes the step "Generate instruction"; 55 denotes the step "Readdress the call"; 56 denotes the step "Exchange data"; 57 denotes the step "Conversation"; 58 denotes the step "Establish connection"; 59 denotes the decision step "Communication quality satisfies?"; 60 denotes the step "Indicate"; 61 denotes the decision step "Any more signals to transmit?"; 62 denotes the step "Exchange data"; 63 denotes the step "Conversation"; 64 denotes the decision step "Data exchange completed?".

Figure 6:
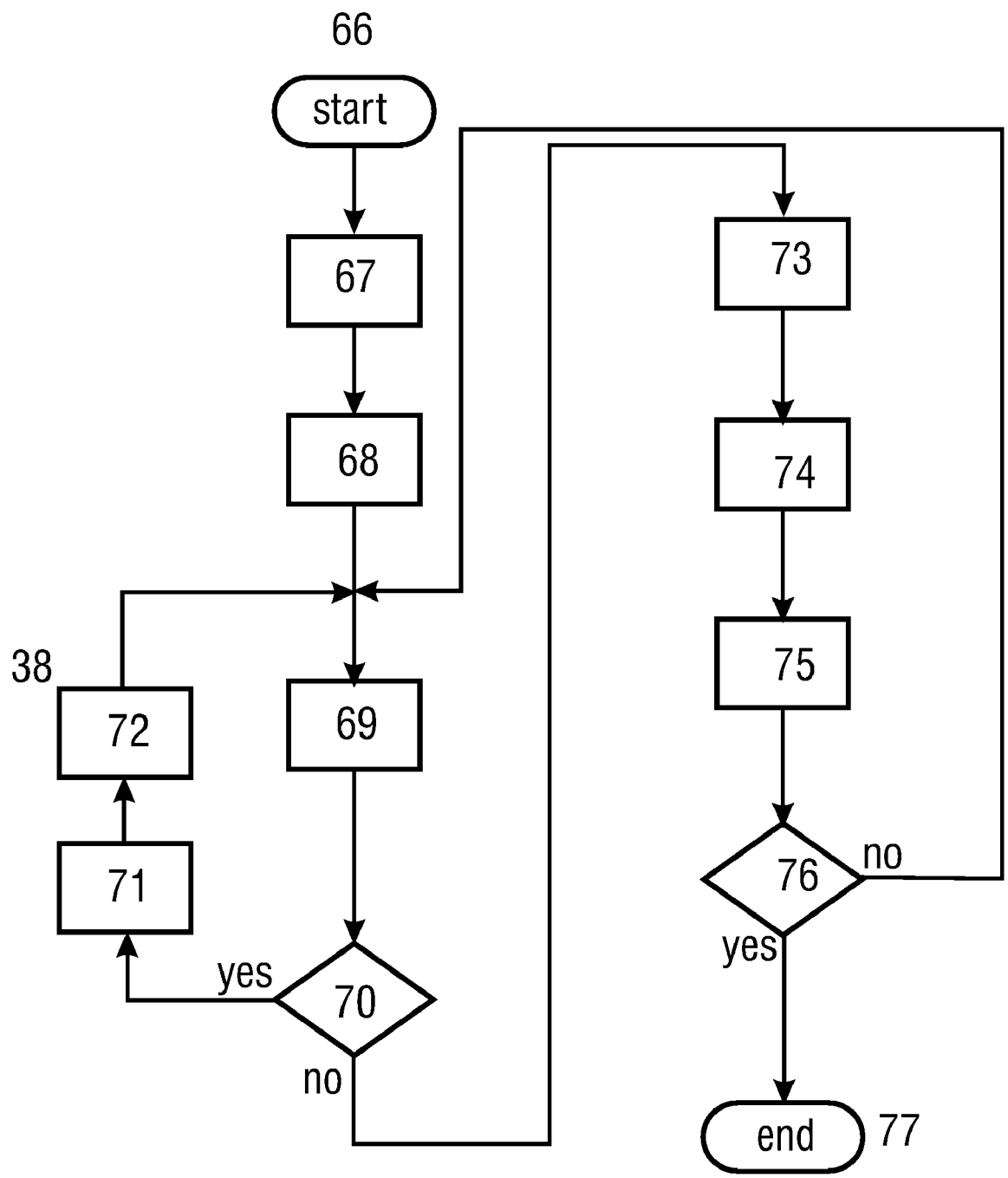
FIG. 6 is a flowchart illustrating how a radiotelephone can be disable.

FIG. 6 is a flow chart illustrating how the radiotelephone can be disabled. Reference numerals in blocks shown in the flow chart correspond to the following steps. 67 denotes the step "Enter disable code"; 68 denotes the step "Enable radiotelephone"; 69 denotes the step "Make measurement"; 70 denotes the decision step "Radiation level exceeds the specified value?"; 71 denotes the step "Disable"; 72 denotes the step "Indicate"; 73 denotes the step "Indicate"; 74 denotes the step "Establish connection"; 75 denotes the step "Conversation"; 76 denotes the decision step "Conversation completed?".

The apparatus for transmitting a message in a mobile communications system operates in accordance with the algorithms shown in FIGS. 5 and 6. The algorithms are implemented using dedicated software stored both in the mobile communications system itself and in memory of the mobile means 1, 3. The operation starts (block 37) from enabling a mobile communication means 1. If the latter is a radiotelephone, step 37 comprises its enabling to generate and transmit a signal to enable a bilateral repeater 3 or to leave the stand-by mode (block 38). The signal can be transmitted by one of transceivers 23. After reception of the signal by input elements (antenna 32 or receiver 5) of a respective transceiver 30 and provision of the signal to input of a repeater controller 29, connection is established (block 29) with a bilateral mobile repeater 3 using auxiliary radiations 6, 8, 15, 16. After the connection has been established, quality of communication over auxiliary radiation is estimated (block 40), and, if required, the bilateral mobile repeater parameters are shown on the display of the mobile communication means 1 (status of power supply of the bilateral mobile repeater, its location, etc.). Estimation of communication quality and transmission of above parameters can be accomplished by generating, in the mobile repeater 3, a specific signal which either transmits quality data of the signal received from the mobile communication means on the channel using auxiliary radiation, or is a signal per se, by which the communication quality is judged, but in the mobile communication means in this case. Estimation of signal quality is performed, as will be shown below, by standard methods using dedicated software after the signal has passed through an A/D converter which can be included in the central controller 22. It should be noted that variation of a signal level is a standard function inherent in numerous mobile systems, e.g. CDMA and GSM mobile telephone communications systems. Signal is generally estimated after its detection and calculation of the signal-to-noise ratio integrated for a predetermined time period. In the absence of the above transmission and reception processes shown by broken arrows 13 and 14 ("No" at the decision step 45) and when the quality estimate of the channels 6, 8, 14, 15 using auxiliary radiations is unsatisfactory ("No" at the decision step 40) the central controller 22 generates an instruction (step 47) to establish connection between the mobile communication means 1 and the BTS 9 on communication channels 11, 12 (step 58). It should be noted that in this case quality estimate values of communication between the mobile communication means 1 and mobile repeater 3 are specified so that .e.g. a message is received by the mobile communication means 1 from the base transceiving station by receiving an electromagnetic energy flux having predetermined parameters and modulated by transmitted data.

The method of transmitting a message in a mobile communications system comprises: transmitting (broken dash arrow 11), by a mobile communication means having a first subscriber or identification number, an electromagnetic radiation encoded by the message, e.g. by modulation, the electromagnetic radiation having predetermined values of electromagnetic radiation parameters, and receiving (broken dash arrow 12), by the mobile communication means 1 from the base transceiving station 9 linked with first subscriber number logging means, an electromagnetic energy flux having predetermined parameters and modulated by transmitted data. If communication quality estimate on channels 11, 12 is unsatisfactory ("No" at the decision step 59) and if desired to repeat attempt to establish connection ("Yes" at the decision step 61), either the signal is re-transmitted (step 38) or the communication is completed (step 64). If the communication quality estimate is satisfactory ("Yes" at the decision step 59), data is communicated (steps 62, 63) on communication channels 11, 12 between the mobile communications system 1 and the BTS 9, step 39 being performed continuously or periodically during the data exchange process ("No" at the decision step 63). Step 63 provides, first, transmission and reception of a message (e.g. as a conversation in duplex mode) on communication channels 11, 12, and step 62 provides communication of control and clock signals between the mobile communication means 1 and base transceiving station 9. If the quality estimate of channels 6, 8, 15, 16 using auxiliary radiations is satisfactory ("Yes" at the decision step 41), the repeater controller 29 generates instructions (step 43) to establish connection between the bilateral mobile repeater 3 and the BTS 9 on communication channels 13, 14. It should be noted that in this case the channel quality estimate values for communication between the mobile communication means 1 and the mobile repeater 3 are specified so that messages are received by the mobile communication means by receiving from the mobile repeater an additional auxiliary radiation modulated by transmitted data. Like the previous case, in the absence of above transmission and reception processes on channels 13, 14 ("No" at the decision step 50) and if the quality estimate is unsatisfactory ("No" at the decision step 44), the central controller 22 generates an instruction (step 52) to establish connection between the mobile communication means 1 and the BTS 9 on communication channels 11, 12. If a predetermined value of communication quality is reached ("Yes" at the decision step 44), all the processes are performed (step 55) that accompany connection of the bilateral repeater 3 with the base transceiving station 9, and then the bilateral mobile repeater 3 receives from the base transceiving station 9 an electromagnetic energy flux having predetermined parameters and modulated by transmitted data, and the message is received by the mobile communication means by receiving from the mobile repeater 3 an additional auxiliary radiation 8, 16 modulated by transmitted data. It should be noted that depending on the base station software (BSS) used in the base station equipment connected to the BTS 9, before (or after) step 57, step 56 can be performed to describe or re-address the call, or simply log a second subscriber number in a respective logging means connected to the BTS 9. In this case e.g. when the radiotelephone 1 is called, connection is established automatically or by operator with the mobile repeater 3, with which control and clock signals are exchanged and through which the message is exchanged with radiotelephone 1. All of the above steps (re-addressing of the call, logging of a second number, etc.) associated with subscriber numbers can be also performed with other numbers used in a respective mobile communications system. By way of example, in the GSM system such numbers include International Mobile Subscriber Identity (IMSI), International Mobile Equipment Identifier (IMEI), ISDN subscriber number. The use of one of such numbers is possible, in particular when a unified subscriber number is assigned to the user. In this case each incoming or outgoing call entails operation of the system through the mobile repeater if the latter is logged (step 55) at the base station. As noted above, in further operation of the system the mobile repeater and the base transceiving station exchange control and clock signals (on channels 13, 14) (step 56), and messages are exchanged, e.g. as a conversation in duplex mode, through the mobile repeater 3 between the mobile communication means 1 and the base transceiving station 9 (step 57). It should be noted that communication quality estimates are tracked continuously or periodically during operation of the system on channels 15, 16 and channels 13, 14 ("No" at the decision step 64), i.e. quality estimate values of communication between the mobile communication means and the mobile repeater ("No" at the decision step 41) or the mobile repeater and the base transceiving station ("No" at decision step 44) are set such that the mobile repeater generates a signal, after reception of which in the base transceiving station the mobile communication means receives from base transceiving station an electromagnetic energy flux having predetermined parameters and modulated by transmitted data. When unsatisfactory communication quality estimate occurs in the operation ("Yes" at the decision step. 45), ("Yes" at the decision step 50) of the mobile repeater 3, the latter can generate signals (steps 48, 53) to be received by the BTS 9 to establish communication directly with the radiotelephone 1. The mobile repeater can simultaneously generate another signals (steps 49, 54) instructing the controller 22 to perform the steps 47 and 52. Most of the aforementioned conditions can be indicated on the radiotelephone display, e.g. indication of respective modes (quality status of communication between the mobile communication means and the mobile repeater, quality status of communication between the mobile repeater and the base transceiving station, etc.) shown in FIG. 5 in blocks 42, 46, 51 and 60. To improve service and operation characteristics, some mobile communication means and mobile repeaters can include the following additional functions or elements: a mobile repeater can provide audible or light signals (to locate the mobile repeater) when a corresponding key is pressed on the mobile communication means or when the mobile communication means outputs ring signal; a mobile repeater can provide audible or light signals when communication is unsatisfactory between the mobile repeater and the mobile communication means; direction towards the mobile repeater location can be indicated on the mobile communication means; a mobile repeater can be equipped with directional antennas 4, 18, 20 and systems for automatically orienting the antennas in the optimal direction; audible message can be sent to the user of the mobile communication means about status of a mobile repeater (battery discharge alarm, mobile repeater location signaling, signal of presence of shielding objects between the mobile repeater and the radiotelephone). An important service function provided by the invention is the ability of disabling the radiotelephone when power of electromagnetic radiation 11 exceeds a predetermined value. This function (see flow chart in FIG. 6) can be used e.g. by parents whose children may neglect the mobile repeater when talking over the radiotelephone. In this case to enable the radiotelephone (step 66) it is necessary to enter a disable code in the radiotelephone memory, e.g. via a keypad (step 67). Then after re-enabling the radiotelephone (step 68) the level of electromagnetic radiation 11 having predetermined parameter values will be measured (step 69). If the radiation level exceeds the predetermined value ("Yes" at the decision step 70) the radiotelephone will be disabled (step 71) and appropriate indication will appear on its display (step 72). If the radiation level is smaller than the predetermined value ("No" at the decision step 70), appropriate indication is displayed (step 73) and connection is established with the BTS 9 (step 74) to accomplish conversation and communication of control and clock data; in this case during the conversation over the radiotelephone (step 75) the electromagnetic radiation level is tracked ("No" at the decision step 76), (step 69).

The invention can be suitably used in particular in such communication fields as mobile telephone communication of all known standards (GSM, TDMA, JDC, CDMA, etc), trunking radiotelephone communications system; personal wireless communication radio stations. This invention can find its wide use also in the public places where persons using a mobile telephone communication can be present. In this case, such places are provided with multichannel mobile repeaters, each comprising, for example, a plurality of subscriber numbers and increased radiation power. Thus, a person having a mobile telephone described herein will be able, first, to reduce irradiation of his brain by hazardous electromagnetic radiation, and, second, improve reliability of communication.

What is claimed is:

1. A method of transmitting a message in a mobile communications system, including the steps of:
    transmitting by a mobile communication means, such as a radiotelephone having a first subscriber or identification number and an input device and a display, an electromagnetic radiation encoded by the message, for example by modulation, and having predetermined values of electromagnetic radiation parameters; and
    receiving, by the mobile communication means from a base transceiving station coupled with a first subscriber or identification number logging means, an electromagnetic energy flux having predetermined parameters and modulated by transmitted data;
    generating, by the mobile communication means, a message-encoded auxiliary radiation; and
    using, for each mobile communication means, at least one mobile repeater having a memory, said mobile repeater receiving and processing the auxiliary radiation for predetermined values of quality estimates of communication between the mobile communication means and the mobile repeater, or between the mobile repeater and the base transceiving station, and generating and transmitting said message-encoded electromagnetic radiation; and
    exchanging control and clock signals between the mobile communication means and the base transceiving station;
    storing, in the mobile repeater memory, a second subscriber or identification number, and connecting, for a predetermined value of said communication quality estimate, the mobile repeater to the base transceiving station, then receiving by the mobile repeater from the base transceiving station the electromagnetic energy flux having the predetermined parameters and modulated by the transmitted data;
    wherein the message being received by the mobile communication means by receiving from the mobile repeater an additional auxiliary radiation modulated by the transmitted data, and said exchanging of the control and clock signals being performed between the mobile repeater and the base transceiving station.

2. The method as claimed in claim 1, wherein a second subscriber or identification number is logged in said logging means for the predetermined value of said communication quality estimate.

3. The method as claimed in claim 1, further comprising generating, by the mobile repeater, an additional auxiliary radiation as light or infrared radiation modulated by the transmitted data.

4. The method as claimed in claim 1, further comprising generating, by the mobile repeater, an additional auxiliary radiation as ultrasound radiation modulated by the transmitted data.

5. The method as claimed in claim 1, further comprising specifying such quality estimate values of communication between the mobile communication means and the mobile repeater, at which values the message is received by the mobile communication means by receiving from the repeater an additional auxiliary radiation modulated by the transmitted data.

6. The method as claimed in claim 1, further comprising specifying such quality estimate values of communication between the mobile communication means and the mobile repeater, at which values the message is received by the mobile communication means by receiving from the base transceiving station the electromagnetic energy flux having the predetermined parameters and modulated by the transmitted data.

7. The method as claimed in claim 1, further comprising disabling the transmission of the electromagnetic radiation having the predetermined values of the electromagnetic radiation parameters by entering a disable code in the mobile communication means via the input device.

8. The method as claimed in claim 7, further comprising disabling the transmission of the electromagnetic radiation if the radiation level exceeds a predetermined value.

9. The method as claimed in claim 1, further comprising specifying such quality estimate values of the communication between the mobile communication means and the mobile repeater, or between the mobile repeater and the base transceiving station, at which values a signal is generated in the mobile repeater, after receiving the signal by the base transceiving station the message is received by the mobile communication means from the base transceiving station by receiving the electromagnetic energy flux with the predetermined parameters and modulated by the transmitted data.

10. The method as claimed in claim 1, further comprising indicating on the display of the mobile communication means, a quality status of communication between the mobile communication means and the mobile repeater.

11. The method as claimed in claim 1, further comprising indicating on the display of the mobile communication means, a quality status of communication between the mobile repeater and the base transceiving station.

* * * * *